United States Patent [19]

Fujimoto

[11] 3,976,988

[45] Aug. 24, 1976

[54] ULTRASONIC WAVE TYPE ALARM DEVICE

[75] Inventor: Yukio Fujimoto, Yachiyo, Japan

[73] Assignee: URO Denshi Kogyo Kabushiki Kaisha, Japan

[22] Filed: Mar. 20, 1974

[21] Appl. No.: 452,917

[30] Foreign Application Priority Data

Mar. 23, 1973 Japan ................................ 48-32624
Mar. 23, 1974 Japan ................................ 48-32625

[52] U.S. Cl. ............................ 340/258 A; 340/1 R; 340/3 D

[51] Int. Cl.² ...................... G08B 13/16; G01S 9/66

[58] Field of Search ...... 343/5 PD; 340/3 D, 258 A, 340/1 R

[56] References Cited

UNITED STATES PATENTS

| | | | |
|---|---|---|---|
| 3,383,678 | 5/1968 | Palmer | 343/5 PD |
| 3,394,342 | 7/1968 | Walker | 340/1 R |
| 3,582,870 | 6/1971 | Peterson et al. | 340/3 D |
| 3,665,443 | 5/1972 | Galvin | 340/258 A |
| 3,681,745 | 8/1972 | Perlman et al. | 340/3 D |

*Primary Examiner*—Richard A. Farley
*Attorney, Agent, or Firm*—Robert E. Burns; Emmanuel J. Lobato; Bruce L. Adams

[57] ABSTRACT

An ultrasonic wave type alarm device is provided with a narrow band filter for passing only a Doppler effect signal of a human body, and a quick discharge type integration circuit for removing the effect of a Doppler effect signal of a small animal other than the human body, thereby to carry out an alarm operation correctly.

7 Claims, 14 Drawing Figures

ULTRASONIC WAVE TYPE ALARM DEVICE

BACKGROUND OF THE INVENTION

This invention relates to ultrasonic wave type alarm devices which detect the presence of a moving object in order to operate its alarm system on the principle of the Doppler effect affecting an ultrasonic wave.

As conducive to a full understanding of this invention, a conventional ultrasonic wave type alarm device will first be briefly described with reference to FIG. 1.

In the conventional ultrasonic wave type alarm device shown in FIG. 1, an electrical signal from an oscillator 1 is applied to an electroacoustic transducer 2 for transmitting ultrasonic waves (hereinafter referred to as a transmitting transducer 2), which in turn transmits an ultrasonic wave signal having a single frequency $f_0$ through the air, and an electroacoustic transducer 3 for receiving ultrasonic waves (hereinafter referred to as a receiving transducer 3) receives ultrasonic waves reflected by an object 9 and produces an electrical signal.

The electrical signal from the receiving transducer 3 is amplified by a high-frequency amplifier 4 and detected through a detection circuit 5 to obtain a low frequency signal. The low frequency signal thus obtained is amplified by a low-frequency amplifier 6 and is introduced to an integration circuit 7, which in turn produces an integration output. The integration output thus produced is applied to an alarm circuit 8.

In this operation, if the object 9 is at rest, the ultrasonic wave signal having the single frequency $f_0$ from the transmitting transducer 2 will be reflected without change by the object 9 and received by the receiving transducer 3, and therefore no low frequency output will be produced by the detection circuit 5. On the other hand, if the object 9 is moving, the ultrasonic wave signal reflected by the object 9 will be changed in frequency from $f_0$ to $f_1$ due to the Doppler effect.

The difference $\Delta f$ between the frequency $f_0$ of the ultrasonic wave signal transmitted and the frequency $f_1$ of the ultrasonic wave signal received is represented by the following equation (1):

$$\Delta_f = (f_0 - f_1) = \frac{2V}{C} \cdot f_0 \qquad (1)$$

where $C$ is the propagation speed of the ultrasonic wave, and V is the speed at which the object 9 approaches or leaves the transmitting transducer 2.

Thus, if there is an object moving around the ultrasonic wave type alarm device, the difference $\Delta f$ will be obtained through the detection circuit 6 and is then amplified by the low frequency amplifier 6 to operate the alarm circuit 8.

When the object is at rest, then $\Delta f = 0$. Therefore, an output of the detection circuit 6 is a certain value of direct current. Since the direct current is blocked by the low frequency amplifier 6, the alarm circuit 8 will not be operated.

However, if there are external disturbances such as those listed below, in the vicinity of the conventional ultrasonic wave type alarm device, they will cause it to carry out erroneous alarm operations. The external disturbances are classified into five groups as follows:

A first disturbance: continuous external noises generated by, for instance, the bell of a telephone set, and a buzzer.

A second disturbance: movements of relatively small insects, such as flies, gold beetles, and moths flying in the vicinity of the alarm device.

A third disturbance: movements of relatively, small animals such as rats or mice and butterflies which are similar to that of a human body, or gliding movements of relatively small animals which are observed when for instance a moth flys without moving its wings.

A fourth disturbance: momentary external noises such as noises or impact sounds which are generated when for instance electrical products are switched on or off.

A fifth disturbance: movements of relatively large animals such as cats and dogs which are more similar to that of a human body.

The erroneous alarm operation due to the fourth disturbance can be prevented by the provision of the integration circuit 7 (FIG. 1). Furthermore, if a detection area to be covered by the alarm device is provided in a room with closed doors so that no animals enter it, the erroneous alarm operation due to the fifth disturbance can also be prevented. However, no countermeasures have been proposed against the erroneous alarm operations which may be caused by the continuous external noises, the movements of insects, and the movements of small animals, that is, the first, second and third disturbances.

SUMMARY OF THE INVENTION

A general object of this invention is, accordingly, to provide a novel ultrasonic wave type alarm device which overcomes all of the above-described difficulties accompanying a conventional ultrasonic wave type alarm device.

A second, more specific, object of the invention is to provide an ultrasonic wave type alarm device which is correctly operated by only a Doppler effect signal due to movements of a human body regardless of the presence of continuous external noises, and living things such as flies and rats in the detection area thereof.

A third object of the invention is to provide an ultrasonic wave type alarm device which can be utilized as a theft prevention device.

A fourth object of the invention is to provide an ultrasonic wave type alarm device which is remarkably improved in reliability when compared with a conventional one.

The novel features believed characteristic of this invention are set forth in the appended claims. This invention itself, however, as well as other objects and advantages thereof, may best be understood by reference to the following detailed description of illustrative embodiments when read in conjunction with the accompanying drawings, in which like parts are designated by like reference numerals or characters.

DETAILED DESCRIPTION OF THE INVENTION

As conducive to a full understanding of this invention, a principle which is utilized in the invention will first be described with reference to FIGS. 2, 3A and 3B.

Figure 2:
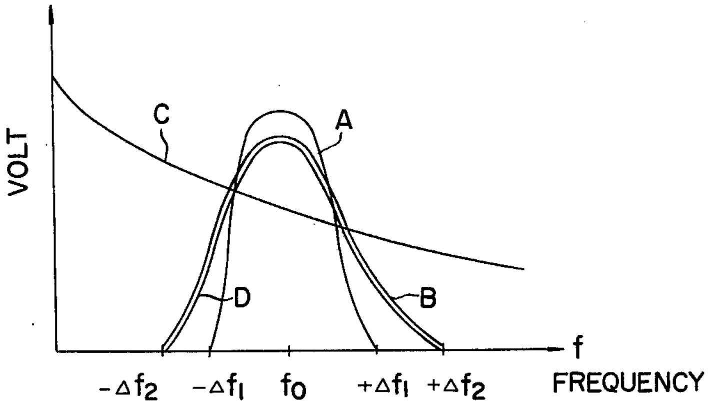
FIG. 2, 3A and 3B are graphical representations indicating signals due to external disturbances which affect the operation of the conventional ultrasonic wave type alarm device.

It is found according to experiments that in the case where a moving object is a human body, the frequency spectrum of an ultrasonic wave signal reflected by the human body, that is, the frequency spectrum of the ultrasonic wave signal subjected to the Doppler effect by the movement of the human body, is represented by a curve A in FIG. 2 and, occupies a frequency band width of $f_0 \pm \Delta f_1$ (an ultrasonic wave signal subjected to the doppler effect being referred to as "a Doppler effect signal" hereinafter).

The frequency spectrum of the first mentioned disturbance, or the continuous external noise, as represented by a curve C in FIG. 2, covers a frequency band which is much wider than that of the curve A indicating the Doppler effect signal of the human body.

The frequency spectrum of a Doppler effect signal due to the second disturbance, or the movement of for instance an insect flying around, as represented by a curve B in FIG. 2, occupies a frequency band which is overlapped with, somewhat wider than, and fairly similar to that of the Doppler effect signal of the human body, because the movement of an insect is, in general, quicker and more intricate than that of a human body.

The frequency spectrum of a Doppler effect signal due to the third disturbance, or the movement of a small animal, as represented by a curve D, covers a frequency band which is almost the same as that of the Doppler effect signal B.

Thus, the frequency band of the Doppler effect signal of the human body is included, as a frequency component, in the frequency spectrum of a signal of the first disturbance, or the continuous noise signal, and also in those of the Doppler effect signals of the second and third disturbances. Accordingly, in the conventional ultrasonic wave type alarm device shown in FIG. 1, when the level of the signal of the first disturbance and the level of the Doppler effect signals caused by the second and third disturbances are sufficiently smaller than the level of the Doppler effect signal of the human body, a proper alarm operation is carried out; however, if the difference between these levels is slight, these signals cannot be separated from one another by the conventional alarm device, which results in an erroneous alarm operation.

In this specification, the term "movement of a human body" is intended to designate all of the movements which the human body may carry out. For instance, it may move with stealthy (soft) steps, or on tiptoe, or it may run. In the conventional ultrasonic wave type alarm device, all of the movements of the human body have been detected.

The speed at which the human body moves on tiptoe is, in general, of the order of 0.4–1 m/sec. Therefore, if $f_0$ = 40 kHz in equation (1), the Doppler effect signal of the human body has its peak value in the vicinity of 40 kHz ± 80–180 Hz as is apparent from a curve $A_1$ in FIG. 3A, the curve $A_1$ being obtained by plotting outputs of the detection circuit 5. On the other hand, the speed at which the human body runs is, in general, of the order of 5 m/sec. In this case, the Doppler effect signal of the human body has its peak value in the vicinity of 40 kHz ± 1200 Hz, as is apparent from a curve $A_2$ in FIG. 3A.

In general, when a human body steals into a building or a room, it moves on tiptoe and never runs. Therefore, it can be said that if an ultrasonic wave type alarm device can detect one of the movements of a human body, that is, a movement where a human body moves with stealthy steps, it will be satisfactory in the practical use of the alarm device.

Furthermore, it is found by experiments that the frequency spectrum of the signal of the first disturbance, that is, the frequency spectrum (a curve Ca in FIG. 3A) of a continuous external noise signal caused by, for instance, the bell of a telephone set covers a frequency band which is wider than that of the frequency spectrum (a curve Aa in FIG. 3A) of the Doppler effect signal of the human body, these two frequency spectra existing at the same time, as was described with reference to FIG. 2. In addition, the frequency spectrum (a curve Ba in FIG. 3A) of a Doppler effect signal caused by the second disturbance or the movement of a small animal such as insects, covers substantially a frequency band of 40 kHz ± 80–1300 Hz, and exists with the frequency spectra Aa and Ca.

On the other hand, small animals, such as rats or mice, related to the third disturbance frequently repeat running and stopping within a short time. That is, they change their moving speeds greatly, abruptly and at random within a short time. Accordingly, as is indicated in FIG. 3B, the frequency band where the frequency spectrum (a curve Da) of the Doppler effect signal of the small animal moving as described occurs is substantially the same as the frequency band of the frequency spectrum Ba of the Doppler effect signal caused by the second disturbance which was described with reference to FIG. 2. In FIG. 3B, various frequency spectra are indicated by the outputs of the detection circuit 5 where an ultrasonic wave of $f_0$ = 40 kHz is transmitted from the transmitting transducer 2. However, it should be noted that the former spectrum Da does not occur to simultaneously cover all the frequency band of the latter spectrum Ba, that is, the position of the frequency spectrum Da moves at random with the moving speed of the small animal and with the lapse of time.

This invention, based on the experimental results described above, prevents an ultrasonic wave type alarm device from an erroneous alarm operation which may otherwise be caused by the third disturbance, that is, the movements of small animal. If the invention is applied to ultrasonic wave type alarm devices which have countermeasures against the other disturbances, it will remarkably improve reliability thereof.

Figure 4:
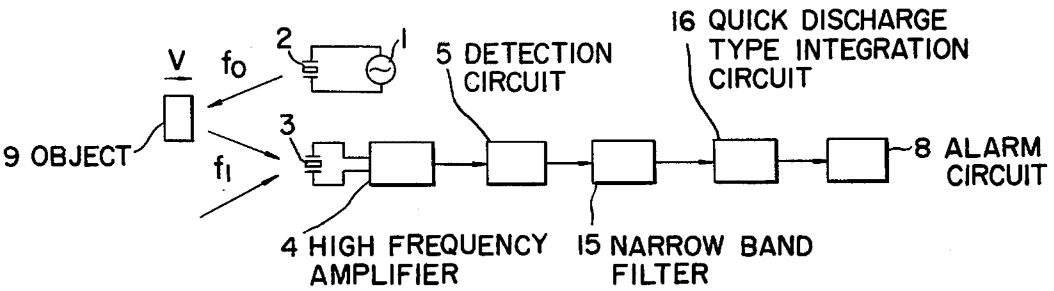
FIG. 4 is a schematic block diagram showing a first example of an ultrasonic wave type alarm device according to this invention.

A first example of the ultrasonic wave type alarm device according to this invention is shown in FIG. 4 where the same parts as those in FIG. 4 are designated by the same reference numerals.

Figure 5:
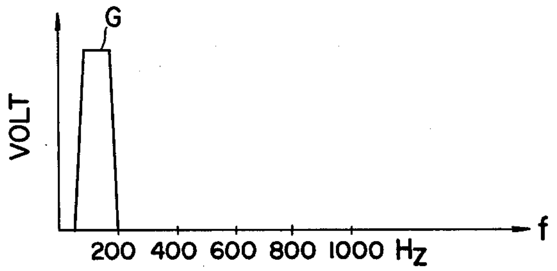
FIG. 5 is a graphical representation indicating the pass band of a narrow band filter in the ultrasonic wave type alarm device shown in FIG. 4.

In this device, an output of the detection circuit 5 is applied to a narrow-band filter 15. This filter 15 passes only the Doppler effect signal (indicated by the curve $A_1$ in FIG. 3A) caused by the movement of a human body which is moving with stealthy steps. More specifically, the narrow-band filter 15, as indicated by reference character G in FIG. 5, has a pass band of from 80 Hz to 180 Hz. Thus, a signal component which has passed through the narrow-band filter 15 has a frequency band of from 80 Hz to 180 Hz and is applied to a quick discharge type integration circuit 16 described below.

Figure 6:
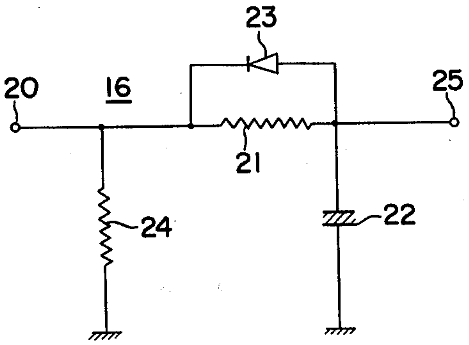
FIG. 6 is a schematic circuit diagram of a quick discharge type integration circuit in the alarm device shown in FIG. 4.

One example of the quick discharge type integration circuit 16 is shown in FIG. 6. In this circuit 16, when an input signal is introduced to an input terminal 20, it is applied through an integrating resistor 21 to a terminal (not grounded) of an integrating capacitor 22; and thereafter, when the introduction of the input signal is suspended, the capacitor 22 is discharged to the ground through a by-pass diode 23 of the integrating resistor 21 and through a discharge resistor 24.

The resistance of the discharge resistor 24 is selected to be a sufficiently small value. As a result, upon application of the input signal a voltage across the capacitor 22 rises slowly at an integration time constant which is determined mainly by the resistance of the resistor 21 and the capacitance of the capacitor 22; however, when the application of the input signal is suspended during this voltage rising operation, the voltage across the capacitor falls quickly at a discharge time constant which is determined mainly by the capacitor 22 and the resistor 24. The abovedescribed voltage across the capacitor 22 is introduced to an output terminal 25 which is connected to the alarm circuit 8 (FIG. 4). When the level of the output from the integration circuit 16 exceeds a certain level (hereinafter referred to as an alarm level when applicable), the alarm operation is carried out by the alarm circuit 8.

In the device shown in FIG. 4, when the human body steals into an area to be detected by the alarm device, an output indicated by the curve $A_1$ (FIG. 3A) is continuously produced by the detection circuit 5 and is applied through the narrow-band filter 15 to the integration circuit 16, as a result of this an integration voltage acros the capacitor 22 is continuously increased to cause the alarm circuit to carry out the alarm operation.

When the third disturbance occurs, that is, for instance a rat runs about in the area to be detected by the ultrasonic wave type alarm device, an output indicated by the curve Da (FIG. 3) is produced by the detection circuit 5. However, as was described, as the rat changes its moving speed, the position of the frequency spectrum of this output moves. Accordingly, only when the frequency spectrum of the output is within the pass band G of the narrow-band filter 15, this filter 15 produces an output indicated by the curve Da, and the output thus produced is integrated by the capacitor 22 in the integration circuit 16. On the other hand, when the rat changes its moving speed so that the position of the frequency spectrum Da is outside the pass band G of the filter 15, no output is produced by the filter 15. As a result, the capacitor 22 in the integration circuit 16 is discharged immediately. The operation described above is repeatedly carried out whenever the moving speed of the rat becomes equal to the speed at which the human body moves with stealthy steps (hereinafter referred to as "a stealthy step speed").

That is, production of the output from the filter 15 is frequently interrupted, as a result of which the output of the integration circuit 16 cannot reach the alarm level of the alarm circuit 8.

As is apparent from the above description, in this invention, based upon the fact that the frequency spectrum of a Doppler effect signal caused by a small animal occurs with its occurence position in frequency being changed with the movement of the small animal, the Doppler effect signal is converted into an intermittent signal, which is eliminated by the quick discharge type integration circuit 16. Accordingly, the movement of a small animal similar to that of a human body will never cause the ultrasonic wave type alarm device to carry out the erroneous alarm operation.

A second example of the ultrasonic wave type alarm device according to this invention will be described with reference to FIG. 7 in which the same parts as those in FIG. 4 are designated by the same numerals.

In this alarm device, no erroneous alarm operation is caused even by the first and the second disturbance, as will become apparent from the following description.

Figure 7:
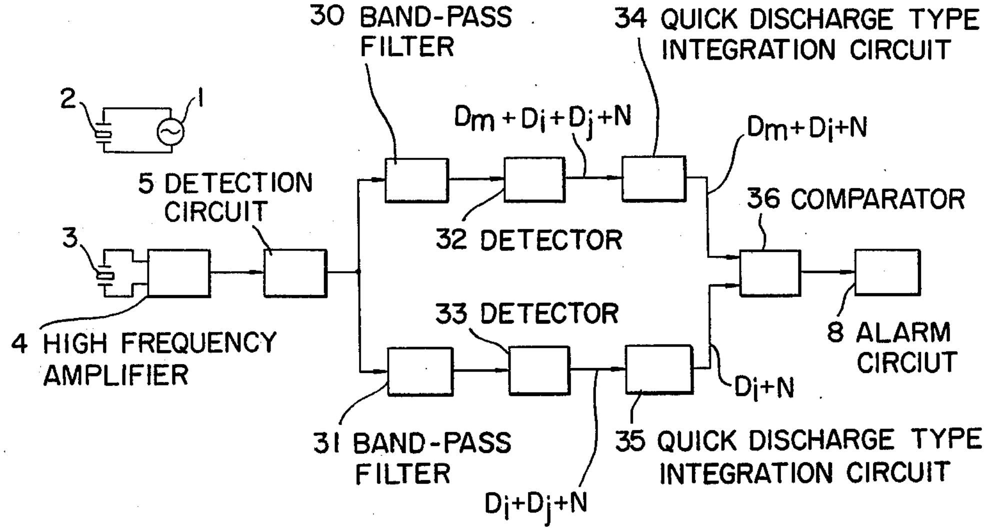
FIG. 7 is a schematic block diagram illustrating a second example of the ultrasonic wave type alarm device according to the invention.
Figure 8:
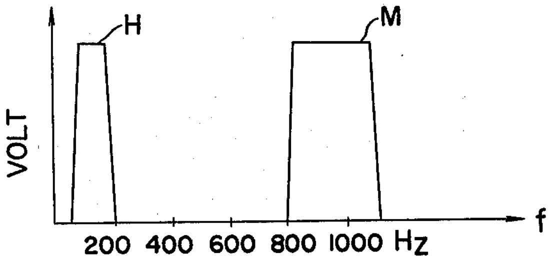
FIG. 8 is a graphical representation indicating the pass bands of narrow band filters in the ultrasonic wave type alarm device shown in FIG. 7.

The alarm device, as shown in FIG. 7, comprises a first band-pass filter 30 whose pass band is within the frequency band of the Doppler effect signal (indicated by the curve Aa in FIG. 3A) caused by the movement of the human body, and a second band-pass filter 31 whose pass band is also within the frequency band of the curve Aa and is different from that of the first band-pass filter 30. More specifically, the pass band of the first band-pass filter 30, as indicated by reference character H in FIG. 8, has a frequency band of, for instance, from 80 Hz to 180 Hz which corresponds to the Doppler effect signal component (indicated by the curve $A_1$ in FIG. 3A) obtained by the movement of the human body who moves with stealthy steps; while the pass band of the second band-pass filter 31, as indicated by reference character M in FIG. 8, has a frequency band of, for instance, from 800 Hz to 1100 Hz.

Figure 3A:
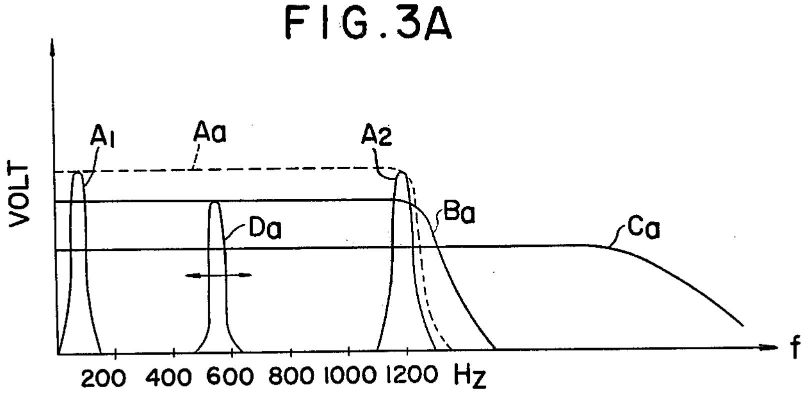
Figure 3B:
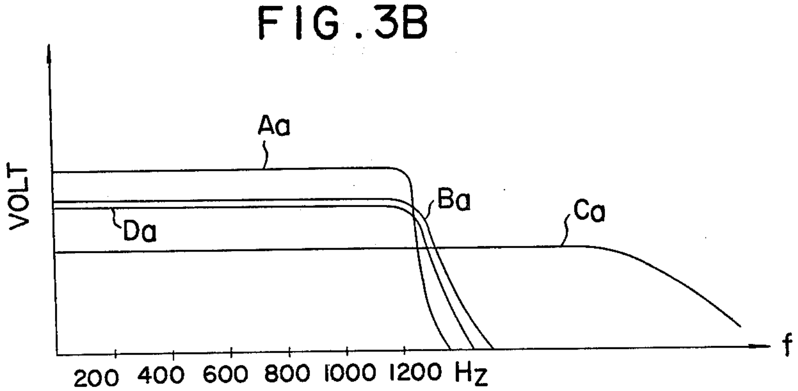

Thus, obtained at the output of the first band-pass filter 30 is a signal component which is the sum in magnitude of a Doppler effect signal component Dm of a human body corresponding to the curve $A_1$ in FIG. 3A, a signal component N of the first disturbance corresponding to the curve Ca in FIG. 3A, a signal component Di of the second disturbance corresponding to the curve Ba in FIG. 3A, and a signal component Dj of the third disturbance in which a small aminal moves at the stealthy step speed described above so that the frequency band of the curve Da is within the pass band H. On the other hand, obtained at the output of the second band-pass filter 31 is a signal component which is the sum in magnitude of the signal components N and Di described above, and a signal component Dj of the third disturbance in which a small animal moves faster than the stealthy step speed so that the frequency band of the curve Da is now within the pass band M of the band-pass filter 31.

The signal components, or outputs, thus obtained at the band-pass filters 30 and 31 are introduced through detectors 32 and 33 to quick discharge type integration circuits 34 and 35 which are similar to the integration circuit 16 in FIG. 4, respectively. Outputs of the integration circuits 34 and 35 are applied to a comparator 36 which is of a differential amplifier type, and a comparison output from the comparator 36 is applied to the alarm circuit.

The gains of the band-pass filters 30 and 31 are, in advance, determined in correspondence to their respective pass bands so that the signal component (Di + N) included in the output of the detector 32 is the same in power as that (Di + N) included in the output of the detector 33. Thus, signal components (Di + N) which are substantially the same in power are obtained in the detectors 32 and 33, respectively, and are then mutually negated by the comparator 8. Accordingly, no signal components (Di + N) based on the first and the second disturbance affect the output of the comparator 36.

On the other hand, the signal components Dj based on the third disturbance which have been applied to the filters 30 and 31 is removed by the quick discharge type integration circuits 34 and 35 in the same manner as in the integration circuit 16 shown in FIG. 4. Accordingly, no effect of the signal components Dj appear at the output of the comparator 36 either.

In conclusion, all of the troubles caused by the first, second and third disturbances can be eliminated by the provision of the ultrasonic wave type alarm device shown in FIG. 7.

The same effects as described above with reference to FIG. 7 can be attained by removing the quick discharge type integration circuits 34 and 35 and by providing a quick discharge type integration circuit, which is the same as that 34 or 35, between the comparator 36 and the alarm circuit 8.

Figure 9:
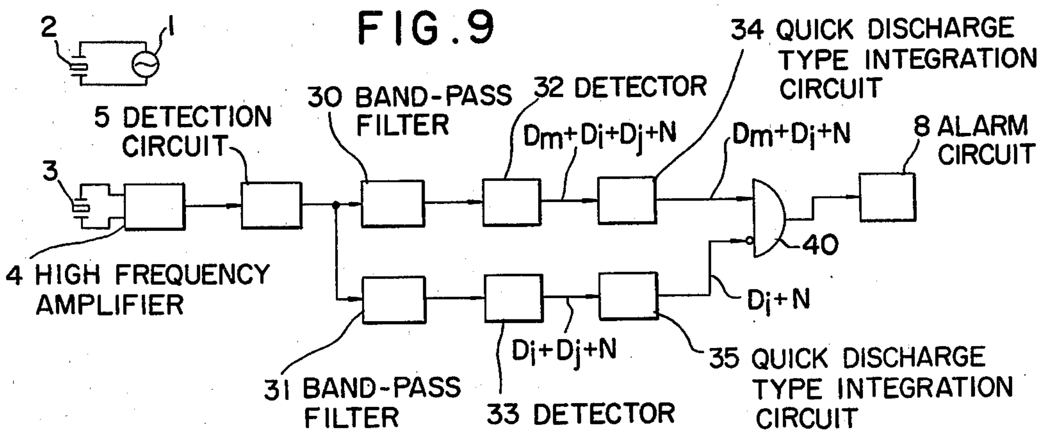
FIG. 9 is a third example of the ultrasonic wave type alarm device according to the invention.

A third example, or modification, of the ultrasonic wave type alarm device according to this invention is shown in FIG. 9. This modification can be achieved by replacing the comparator 36 of the alarm device shown in FIG. 7 with an inhibit gate circuit 40, as is apparent from the comparison between FIG. 7 and FIG. 9.

The output of the filter 31 is applied, as an inhibit gate signal, to the inhibit gate circuit 40. Therefore, only when no signal components Di and N are provided by the filter 31, the signal component Dm from the filter 30 is applied through the inhibit gate circuit 40 to the alarm circuit 8.

When the signal components Di and N are provided by the filter 31, no output is produced by the inhibit gate circuit 40. Thus, the effects of the first and second disturbances can be eliminated. In addition, the effect of the third disturbance is removed by the integration circuits 34 and 35, as was described.

The ultrasonic wave type alarm device shown in FIG. 9 may be modified in a manner such that the integration circuit 34 and 35 are removed, and instead a quick discharge type integration circuit which is the same as the integration circuits 34 and 35 is provided between the inhibit gate circuit 40 and the alarm circuit 8.

Furthermore, the same effects or merits as described above can be attained by providing amplifiers respectively at the rear stages of the filters 15, 30 and 31 in FIGS. 4, 7 and 9, or by replacing these filters with narrow-band amplifiers.

Figure 10:
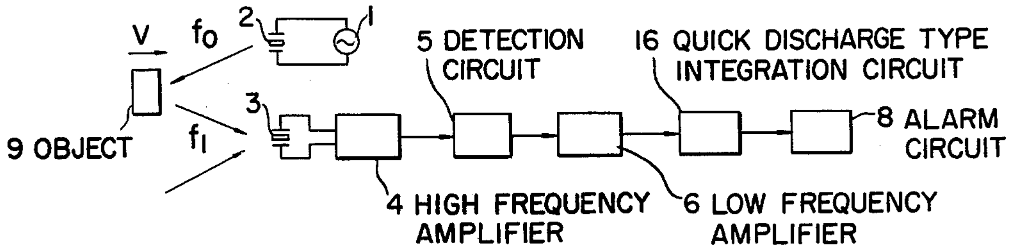
FIG. 10 is a fourth example of the ultrasonic wave type alarm device according to the invention.

A fourth example of the ultrasonic wave type alarm device according to another aspect of this invention is shown in FIG. 10. This alarm device is based on the fact that in general, insects such as flies and small animals such as rats frequently move at random in various directions within a relatively short time, but a human body does not move so frequent and quick as these insects or small animals. That is, in this ultrasonic wave type alarm device, the effects of the second and third disturbances out of the above-described disturbances, or the effects of the movements of the insects and small animals, can be positively removed. Accordingly, if this invention is applied to ultrasonic wave type alarm devices which are provide with a countermeasure against the first disturbance, the reliability thereof can be remarkably improved.

Figure 1:
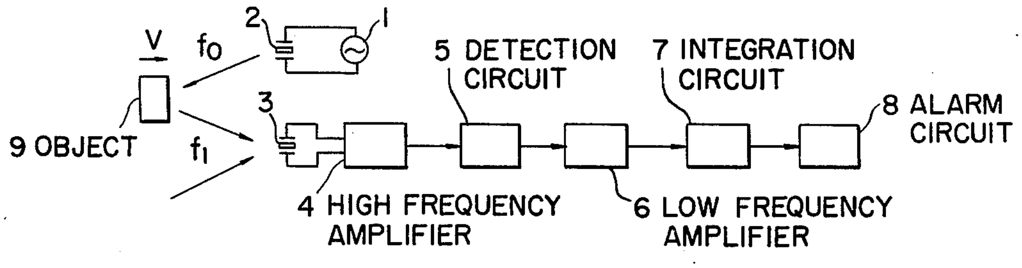
FIG. 1 PRIOR ART
FIG. 1 is a schematic block diagram of a conventional ultrasonic wave type alarm device.

The fourth example of the alarm device can be obtained by modifying the conventional ultrasonic wave type alarm device shown in FIG. 1. This modification is achieved by changing the integration circuit 7 into the quick discharge type integration circuit 16, which was described with reference to FIGS. 4 and 6, so that the output of the amplifier 6 is applied to the quick discharge type integration circuit 16. In addition to this modification, the transmitting transducer 2 and the receiving transducer 3 are replaced by ones whose directivity pattern is wide in the direction of movement of a human body and narrow to the movements of living things different from the movement of the human body.

Figure 11A:
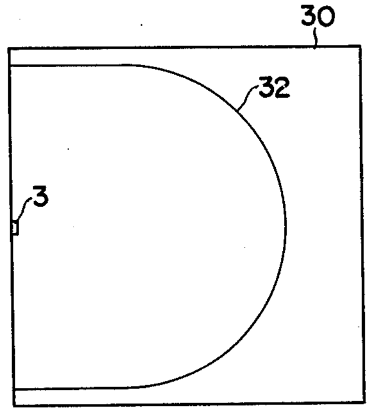
FIGS. 11A and 11B are explanatory diagrams illustrating one example of the directivity patterns of transducers employed in the ultrasonic wave type alarm device shown in FIG. 10.
Figure 11B:
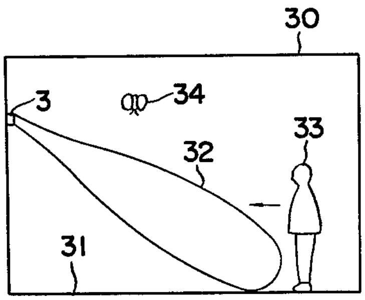

For instance, in the case where substantially all the area of a room 30 is to be watched by the ultrasonic wave type alarm system, the receiving transducer 3, for example as shown in FIGS. 11A and 11B, may be provided in the room in such a manner that its directivity is sufficiently low in gain in a direction parallel to the floor surface 31 of the room 30 and is high in gain in a direction perpendicular to the floor 31. A transducer with a horizontal length $l = \lambda/2$ and a vertical length $h = 2\lambda$ (where $\lambda$ is the wave length of the transmitting ultrasonic wave (frequency $f_o$)) is available as the transducer having such directivity as described above.

The directivity pattern 32 of this tranducer is flat, being wide in horizontal direction and narrow in vertical direction. Accordingly, whenever a human 33 moves in the room, he moves within the sensing range of the transducer 3. As a result, a signal corresponding to the curve Aa (in FIG. 3B) is continuously obtained in the amplifier 6. When this continuous signal is applied to the integration circuit 16, the integration voltage of the capacitor 22 (FIG. 6) rises continuously and finally causes the alarm circuit 8 to carry out the alarm operation.

On the other hand, in the case where, for instance, a moth 34 as a source of the third type disturbance flies about in the room 30, since it moves at random in various directions, it frequently passes through the sensing range of the transducer 3 within a short time. When the moth comes into the sensing range of the transducer, a signal corresponding to the curve Ba (FIG. 3A) is obtained in the amplifier 6, while the capacitor 22 of the quick discharge type integration circuit 16 starts integration of the signal. However, soon the moth is out of the sensing range of the transducer 3 before the level of the integration voltage across the capacitor 22 reaches the alarm level of the alarm circuit 8, and therefore the capacitor 22 is discharged. Thus, even if a moth 34 or the like flies about in the room 30, the output of the amplifier 6 is an intermittent signal. Consequently, no alarm operation is carried out by the alarm circuit 8.

Furthermore, if the directivity pattern of the transducer 3 is so directed that the sensing range of the transducer 3 covers only a part of the floor 31 or none of the floor 31, the effect of the third disturbance, or the effect of a rat running about on the floor 31, can be eliminated in the same manner as described above.

As is apparent from the above description, the ultrasonic wave type alarm device according to the second aspect of the invention is based on the fact that the movements of the insects such as flies and of the small animals such as rats, which are the causes for the second and third disturbances, frequently change at random within a short time. Therefore, in the alarm device, the Doppler effect signal due to the second or the third disturbance is converted into a intermittent signal, which is eliminated by the quick discharge type integration circuit. As a result, even if a small animal comes into the detection area of the alarm device, it will never cause the alarm device to carry out the erroneous alarm operation.

Figure 12:
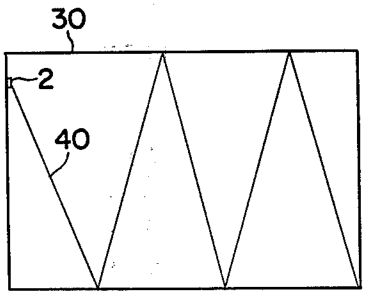
FIG. 12 is also an explanatory diagram illustrating a method of transmitting an ultrasonic wave in a room.

The directivity pattern described above is flat; however, it is not limitative. The directivity pattern may be modified according to the construction of a place to be monitored or watched by the alarm device. For instance, if a passageway is to be watched by the alarm device, a beam-shaped directivity pattern may be employed. Furthermore, since an ultrasonic wave, as shown in FIG. 12, reflects between the floor and the ceiling of a room to be watch by the alarm device, the ultrasonic wave having considerably flat directivity pattern may be transmitted in the form of a curtain. That is, all that is necessary for the provision of the transducer in the alarm device is to employ a transducer whose directivity pattern is wide with respect to the movement of a human body and narrow with respect to the movements of small living things different from the movement of the human body. For this purpose, a number of transducers having a beam-shaped directivity pattern may be combined. In addition, if a plurality of transducers are provided at different positions, respectively, various directivity patterns can be obtained.

I claim:

1. In an ultrasonic alarm system of the type having an ultrasonic wave transmitter for transmitting ultrasonic waves through air; an ultrasonic wave receiver for receiving ultrasonic waves having Doppler effect frequency components; and a detector circuit for developing electrical Doppler frequency signals; the improvement which comprises:

a. a first bandpass filter receptive of the Doppler frequency signals developed by said detector circuit and having a narrow pass band effective to pass only Doppler frequency signals having frequencies characteristic of certain human motions;

b. a first quick discharge integrator circuit for integrating the output Doppler frequency signals from said first bandpass filter;

c. a second bandpass filter receptive of the Doppler frequency signals developed by said detector circuit and having a narrow pass band within the frequency band of said Doppler frequency signals and without the pass band of said first bandpass filter;

d. a second quick discharge integrator circuit for integrating the output Doppler frequency signals from said second bandpass filter; and e. a comparator receptive of the outputs from said first and said second quick discharge integrator circuits.

2. In an ultrasonic alarm system according to claim 1, wherein said comparator comprises a differential amplifier.

3. In an ultrasonic alarm system according to claim 1, further comprising an alarm enabled by electrical signals above a certain threshold value, and means for applying the comparator output to said alarm.

4. In an ultrasonic alarm system according to claim 1, wherein said quick discharge circuits each comprise: a capacitor; a resistor connected to said capacitor for applying the output Doppler frequency signals from a respective one of said bandpass filters to charge said capacitor; a diode connected in parallel with said resistor and connected having a polarity relative to the charge stored in said capacitor to conduct in the absence of a Doppler frequency signal applied to said resistor; and a second resistor connected to a junction of said first resistor and said diode for providing a discharge path when said diode is conductive.

5. In an ultrasonic alarm system according to claim 1, wherein said transmitter develops ultrasonic waves having a frequency on the order of 40 Kilohertz, one of said bandpass filters has a pass band from about 80 Hz to about 180 Hz, and the other of said bandpass filters has a pass band within the range of about 800 Hz to 1100 Hz.

6. In an ultrasonic alarm system of the type having an ultrasonic wave transmitter for transmitting ultrasonic waves through air; an ultrasonic wave receiver for receiving ultrasonic waves having Doppler effect frequency components; and a detector circuit for developing electrical Doppler frequency signals; the improvement which comprises:

a. a bandpass filter receptive of the Doppler frequency signals developed by said detector circuit and having a narrow pass band effective to pass only Doppler frequency signals having frequencies characteristic of certain human motions; and b. a quick discharge integrator circuit for integrating the output Doppler frequency signals from said bandpass filter; and c. wherein said ultrasonic wave transmitter comprises an electroacoustic transducer having a directivity pattern with a wide dimension in the direction of movements of a moving object to be detected, and having a narrow dimension in directions different from the direction of the movements to be detected.

7. In an ultrasonic alarm system of the type having an ultrasonic wave transmitter for transmitting ultrasonic waves through air; an ultrasonic wave receiver for receiving ultrasonic waves having Doppler effect frequency components; and a detector circuit for developing electrical Doppler frequency signals; the improvement which comprises:

a. a bandpass filter receptive of the Doppler frequency signals developed by said detector circuit and having a narrow pass band effective to pass only Doppler frequency signals having frequencies characteristic of certain human motions; and b. a quick discharge integrator circuit for integrating the output Doppler frequency signals from said bandpass filter; and c. wherein said ultrasonic wave receiver comprises an electroacoustic transducer having a directivity pattern with a wide dimension in the direction of movements of a moving object to be detected, and having a narrow dimension in directions different from the direction of the movements to be detected.

* * * * *